(12) United States Patent
Rabefarihy et al.

(10) Patent No.: US 9,646,160 B2
(45) Date of Patent: May 9, 2017

(54) APPARATUS AND METHOD FOR PROVIDING RESILIENCE TO ATTACKS ON RESET OF THE APPARATUS

(71) Applicant: ARM LIMITED, Cambridge (GB)

(72) Inventors: Yohann Fred Arifidy Rabefarihy, Juan-les-pins (FR); Carlo Dario Fanara, Antibes (FR); Stephane Zonza, Cannes (FR); Jean-Baptiste Brelot, Antibes (FR)

(73) Assignee: ARM Limited, Cambridge (GB)

( * ) Notice: Subject to any disclaimer, the term of this patent is extended or adjusted under 35 U.S.C. 154(b) by 399 days.

(21) Appl. No.: 14/479,688

(22) Filed: Sep. 8, 2014

(65) Prior Publication Data

US 2017/0061137 A1 Mar. 2, 2017

(51) Int. Cl.
*G06F 21/00* (2013.01)
*G06F 21/60* (2013.01)
*G06F 21/55* (2013.01)

(52) U.S. Cl.
CPC ............ *G06F 21/60* (2013.01); *G06F 21/558* (2013.01)

(58) Field of Classification Search
CPC ...................................................... G06F 21/60
See application file for complete search history.

(56) References Cited

U.S. PATENT DOCUMENTS

| | | | | |
|---|---|---|---|---|
| 2007/0248085 A1* | 10/2007 | Volpano | ............... | H04L 12/4679 370/389 |
| 2008/0189559 A1* | 8/2008 | Delfs | ................... | G06F 12/1408 713/193 |
| 2009/0254994 A1* | 10/2009 | Waterson | ................ | G06F 21/83 726/26 |
| 2010/0082513 A1* | 4/2010 | Liu | ..................... | H04L 63/1458 706/46 |
| 2012/0323381 A1* | 12/2012 | Yadav | ................. | H04L 63/0236 700/286 |
| 2013/0145130 A1* | 6/2013 | Brelot | ..................... | G06F 9/384 712/217 |
| 2014/0047549 A1* | 2/2014 | Bostley, III | ............. | G06F 21/60 726/26 |
| 2014/0129883 A1* | 5/2014 | Spruth | ................... | G11C 29/12 714/718 |
| 2015/0067874 A1* | 3/2015 | Johnson | .................. | G06F 21/14 726/26 |
| 2015/0347762 A1* | 12/2015 | Horne | ..................... | G06F 21/60 726/26 |

* cited by examiner

*Primary Examiner* — Amir Mehrmanesh
*Assistant Examiner* — Ali Shayanfar
(74) *Attorney, Agent, or Firm* — Nixon & Vanderhye P.C.

(57) ABSTRACT

An apparatus and method are provided for enhancing resilience to attacks on reset of the apparatus. The apparatus comprises at least one storage element, and update circuitry that is configured to receive obscuring data, and which is responsive to a reset event to store in each of the at least one storage element a data value that is dependent on the current value of the obscuring data. For each such storage element, this ensures that the data value stored in that storage element is unpredictable following each reset event, thereby preventing the reproducibility of certain steps that would typically be taken by an attacker during an attack on the apparatus.

16 Claims, 8 Drawing Sheets

APPARATUS AND METHOD FOR PROVIDING RESILIENCE TO ATTACKS ON RESET OF THE APPARATUS

BACKGROUND

Technical Field

The present technique relates to an apparatus and method for providing resilience to attacks on reset of the apparatus.

Description of the Prior Art

It is known to provide processing circuits which perform data processing operations using data that needs to be protected against unauthorised access. The data that needs protecting can take a variety of forms, but as a particular example it is known to provide processing circuits that perform encryption and decryption using particular encryption and decryption algorithms that make use of secret data such as a secret key. Such a secret key needs to be protected in order to avoid the encryption being circumvented. As another example, some processing circuitry will be able to operate in one or more privileged states where the data being manipulated in those states is not accessible from a user operating state. It is important to ensure that an attacker cannot gain entry to the privileged state of operation, in order to ensure that the security of the data being processed in the privileged state is maintained.

A number of techniques have been developed to seek to unlawfully access such secure data within a processing circuit such as an integrated circuit. For example, one known technique for seeking to access such secret data is differential power analysis (DPA). Such DPA techniques seek to extract secret data such as the earlier-mentioned secret key from observation of a power consumption characteristic of the processing circuitry for various different input data. On each reset of the apparatus, the attacker will seek to re-run the same processing operations using different input data and monitor a power consumption characteristic such as a current signature of the apparatus in order to determine how that power consumption characteristic changes for various different input data.

Since it is generally known what algorithms are being executed by the integrated circuit, it is possible to model the operation of the integrated circuit and thereby produce simulated current signatures for various different guesses of the secret key. Attempts can then be made to correlate the simulated current signatures for various guesses of the secret key with the actual current signatures observed in the circuit, in order to thereby seek to determine the secret key.

Another known mechanism for seeking to gain unlawful access to secret data within processing circuitry such as an integrated circuit is to inject transient faults in a systematic manner in order to seek to compromise the security of the apparatus. For example, the security of processor cores and cryptographic engines can potentially be compromised by injecting deliberate faults by attackers. Such an approach may for example be performed on a reset of the apparatus in order to seek to unlawfully gain access to the privileged state mentioned earlier, thereby allowing access to the secure data.

It would be desirable to provide an improved technique for providing resilience to such attacks performed on reset of an apparatus.

SUMMARY

Viewed from a first aspect, there is provided an apparatus comprising: at least one storage element; and update circuitry configured to receive obscuring data, and responsive to a reset event to store in each of said at least one storage element a data value that is dependent on a current value of the obscuring data.

Viewed from a second aspect, there is provided a method of updating at least one storage element within an apparatus, comprising: receiving obscuring data; and responsive to a reset event, storing in each of said at least one storage element a data value that is dependent on a current value of the obscuring data.

Viewed from a third aspect, there is provided an apparatus comprising: at least one storage element means; and update means for receiving obscuring data, and responsive to a reset event, for storing in each of said at least one storage element means a data value that is dependent on a current value of the obscuring data.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
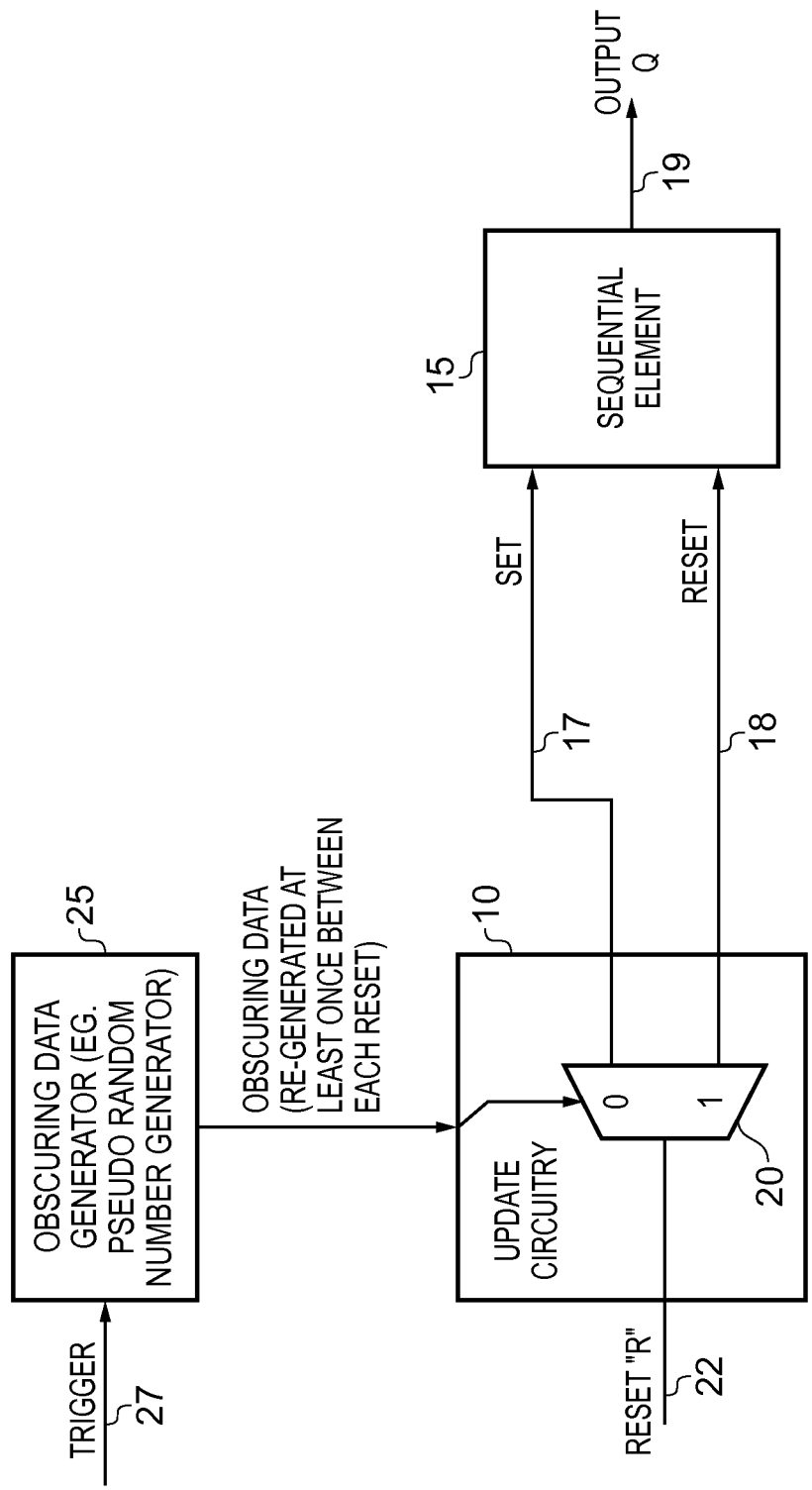
FIG. 1 is a block diagram of an apparatus in accordance with one embodiment.

Before discussing the embodiments with reference to the accompanying figures, the following description of embodiments and associated advantages is provided.

In accordance with one embodiment, for at least one storage element within the apparatus the data value that is stored in that storage element upon a reset is made unpredictable. In particular, update circuitry receives obscuring data, and on a reset event the data value stored in the storage element is dependent on the current value of the obscuring data. This unpredictability in the update of the storage element upon a reset event can be used to inhibit the earlier-mentioned types of attack. In particular, the earlier-mentioned fault injection and DPA attacks are reliant on being able to reproduce certain actions following a reset of the apparatus. Typical circuit designs reset storage elements to a defined value, but in certain blocks of logic this can assist in performing the earlier-mentioned attacks. However, through use of the above approach, for any storage element to which the present technique is applied, the data value stored in that storage element upon a reset is not predictable, and this can be used to inhibit the above mentioned attack mechanisms by preventing the reproducibility of certain steps that might be taken by an attacker when seeking to compromise the security of data within the apparatus.

There are a number of ways in which the obscuring data can be generated. However, in one embodiment the apparatus further comprises obscuring data generation circuitry responsive to a trigger event to generate the current value for the obscuring data.

The trigger event can take a variety of forms, but in one embodiment the trigger event occurs frequently enough that the current value of the obscuring data is unpredictable across multiple reset events. In one embodiment the trigger event is configured to occur at least once for each occurrence of the reset event, so that the current value of the obscuring data is determined at least once between each reset event. Whilst the trigger event could for example occur on elapse of a predetermined time period, where the time period was chosen to be small enough so as to ensure that the trigger event occurs at least once between each reset, in one embodiment the trigger event comprises the reset event itself. Hence, upon occurrence of a reset event, the obscuring data generation circuitry will be triggered to generate a current value for the obscuring data.

The obscuring data generation circuitry can take a variety of forms, but in one embodiment takes the form of a pseudo-random number generator, thereby ensuring that the current value of the obscuring data is a pseudo-random value. By ensuring that the obscuring data takes the form of a pseudo-random value, and is regenerated at least once between each reset event, this ensures that the data value stored in the at least one storage element remains unpredictable across multiple reset events, hence providing resilience to the earlier-mentioned types of attack. The pseudo-random number generator may in one embodiment be provided separately to the update circuitry and associated storage element(s), and indeed a pre-existing and/or separately managed pseudo random number generator, such as one already existing within the system for another purpose, may be used in one embodiment.

Typically, the above technique will be applied in relation to multiple storage elements within the apparatus. In one embodiment, the current value of the obscuring data may be specified independently for each storage element. Hence, for example, in different parts of the apparatus various unrelated storage elements can be updated with different data values on a reset, dependent on the current value of the obscuring data specified in association with each of those storage elements.

In an alternative embodiment, a number of the storage elements may be grouped to form a plurality of storage elements that share the same current value of the obscuring data. In such an arrangement, the update circuitry is then responsive to the reset event to store different but correlated data values in each of the plurality of storage elements in dependence on the current value of the obscuring data. This is useful in embodiments where the plurality of storage elements are used to perform some further obscuring functionality in respect of at least one control signal within the apparatus, providing further improved resilience to attack. As will be described in more detail later, two such examples of this approach are where such a group of storage elements are used to modify a memory region identifier signal before that signal is used within a memory protection unit, or where the group of storage elements are used to implement a renaming table functionality to convert a control signal specifying a logical address into a modified control signal specifying a physical address.

There are a number of ways in which the data value stored in the at least one storage element can be made dependent on a current value of the obscuring data. In one embodiment, for each of said at least one storage element, the update circuitry is responsive to the reset event to either set that storage element or reset that storage element, dependent on the current value of the obscuring data.

Hence, in such an arrangement, the reset event may sometimes cause a storage element to be reset and other times cause the storage element to be set, this resulting in different data being stored in the storage element dependent on whether it is being set or reset. Considering a simple single bit storage element, it may be the case that when that storage element is reset a logic zero value is stored in the storage element, whereas when that storage element is set a logic one value is stored in the storage element. By determining whether to reset the storage element or set the storage element dependent on the current value of the obscuring key, it will be appreciated that the actual data value stored in such a storage element upon a reset event will not be predictable.

The update circuitry can take a variety of forms, but in one embodiment implements an XOR function using the current value of the obscuring data as one input and a predetermined value as another input.

Such an approach is particularly beneficial when there are multiple storage elements arranged to form a group of storage elements, with the current value of the obscuring data being shared between that group of storage elements. A separate XOR function will be provided in association with each storage element in the group, and the predetermined value provided as the other input of each XOR function will be different for each of the XOR functions. This ensures that different but correlated data values are stored in each of the storage elements of the group in dependence on the obscuring data.

Whilst in one embodiment the update circuitry implements an XOR function, in alternative embodiments other mechanisms can be used. For example, in one embodiment the update circuitry may use a lookup table approach in order to generate an input for a sequential element that varies in dependence on the obscuring data value.

The storage elements can take a variety of forms, but in one embodiment are sequential storage elements such as a flip-flop (edge sensitive) or a latch (state sensitive).

In one embodiment, the at least one storage element comprises a plurality of storage elements forming a remapping group of storage elements, and the apparatus further comprises: modification circuitry configured to modify a value of a control signal dependent on the remapping group of storage elements in order to generate a modified value for the control signal; and processing circuitry configured to operate in dependence on the modified value of the control signal.

Hence, in this embodiment, the plurality of storage elements that are updated in the above described manner are then used to modify a control signal prior to the use of that control signal by processing circuitry. This further inhibits the reproducibility of certain attacks that may be attempted. For example, if an attacker were to seek to inject a particular fault into the apparatus in order to seek to cause the processing circuitry to operate in a particular way, this will not be reproducible across multiple reset events due to the control signal being modified differently between different reset events. Further, any DPA techniques seeking to monitor the operation of the processing circuitry will not produce reliable results, since the way in which the processing circuitry operates following each reset event, even when provided with the same input data, will vary, and for example the modified control signal may cause different hardware elements to be used following each reset event.

The way in which the modification circuitry modifies the value of the control signal may vary dependent on embodiment. However, in one embodiment, the modification circuitry is configured to use the value of the control signal to identify a storage element within the remapping group, and to output the data value stored in the identified storage element as the modified value of the control signal.

The above described technique can be applied to a variety of components within the apparatus. However, by way of example, in one embodiment memory address space for the apparatus is formed of a plurality of memory regions, and the processing circuitry is a memory protection unit having address range registers used to identify an address range for each memory region. The remapping group of storage elements identify which address range registers are associated with each memory region, and the control signal comprises a memory region identifier signal.

Hence, in such an embodiment, which physical address range registers are associated with each address range will vary between reset events, with the remapping group of storage elements providing the appropriate mapping, and with that mapping being re-determined upon each reset event.

In one embodiment, the modification circuitry is configured to use the value of the memory region identifier signal to identify a storage element within the remapping group, and to output the data value stored in the identified storage element as the modified value of the memory region identifier signal.

Hence, in such an embodiment the update circuitry produces a correlated set of data values to identify each of the various memory regions, but how those values are stored in the various storage elements of the group will vary on each reset event, dependent on the current value of the obscuring data. Thus, which physical address range registers are associated with each memory region within the memory protection unit will also vary between reset events.

As another example use case, in one embodiment the remapping group of storage elements form a renaming table providing a logical address to physical address mapping for registers, the value of the control signal specifies a logical address for a register, and the modification circuitry is configured to convert the logical address into a corresponding physical address for the register in dependence on the renaming table, in order to output as the modified value for the control signal the corresponding physical address.

Hence, in such an arrangement, the way in which logical register addresses are mapped to corresponding physical register addresses will be re-determined following each reset event, and will be dependent on the current value of the obscuring data. In particular, the update circuitry will generate on each reset event a set of correlated data values providing a mapping between each logical register and each physical register, with that mapping being dependent on the current value of the obscuring data.

In one embodiment, the processing circuitry is then configured to perform a register access operation in respect of the register identified by the physical address forming the modified value for the control signal, i.e. the value of the control signal as obtained from the renaming table formed by the remapping group of storage elements.

Particular embodiments will now be described with reference to the figures. FIG. 1 is a diagram schematically illustrating components provided in association with a sequential storage element 15 in accordance with one embodiment. In one embodiment, the sequential storage element 15 may be an edge sensitive storage element such as a flip-flop whose contents are updated on the edge of a clock signal, or may be a state sensitive storage element such as a latch where input data is sampled during one period of time, and then held constant during another period of time.

Update circuitry 10 is provided in association with the sequential storage element 15 and is responsive to a reset signal over path 22. The update circuitry 10 also receives obscuring data from an obscuring data generator 25 that is responsive to a trigger event over path 27. Each time the trigger is asserted over path 27, the obscuring data generator will regenerate the obscuring data, and the current value of the obscuring data will be provided to the update circuitry. The obscuring data generator can take a variety of forms, but in one embodiment is a pseudo random number generator such that the current value of the obscuring data is a pseudo random value.

The update circuitry 10 is arranged such that upon a reset event as indicated by the reset signal over path 22, a data value is stored in the sequential element 15 which is dependent on the current value of the obscuring data received from the obscuring data generator 25. There are a number of ways in which the data value stored in the sequential element 15 can be arranged to be dependent upon a current value of the obscuring data. FIG. 1 illustrates one example arrangement where the current value of the obscuring data is used to determine whether the sequential storage element 15 is set (via path 17) or reset (via path 18) upon a reset event. Whereas in a typical design a sequential storage element may be reset to a predefined value (either a logic 1 value or a logic 0 value) upon a reset, by the above described approach it will be seen that the data value stored in the sequential storage element 15 will vary over multiple resets, dependent on the current value of the obscuring data at each reset. For example, if the obscuring data has a logic 0 value, this may cause the reset event to trigger the setting of the sequential element, whereas if the obscuring data has a logic 1 value, this may cause the reset event to trigger a reset of the sequential storage element. This functionality is indicated simplistically in FIG. 1 by the de-multiplexer 20. However, it will be appreciated that the circuitry provided within the update circuitry 10 will not merely implement a de-multiplexing functionality, since it will be necessary for the update circuitry to ensure that any invalid states are avoided. For example, for a sequential storage element having both set and reset pins, it will need to be ensured that when the set pin is set to a logic 1 value, the reset pin has a logic 0 value, since the "11" state is an invalid state.

The trigger event that causes a trigger signal to be asserted over path 27 to the obscuring data generator 25 in order to cause the obscuring data to be regenerated, can take a variety of forms. To maximise the benefits of the described approach, it is highly beneficial for the obscuring data to be regenerated at least once between each occurrence of the reset event, as this ensures that the content stored in each sequential element 15 upon a reset is unpredictable. Whilst the trigger may in one embodiment be asserted each time a certain time period elapses, where that time period is chosen to be short enough as to occur at least once between each reset event, in one embodiment, the trigger signal is merely asserted in response to the reset event, to cause the obscuring data to be regenerated each time there is a reset event.

In one embodiment, the contents of the sequential storage element 15 are updated as the reset signal is de-asserted at the end of the reset procedure. Hence in one embodiment, the reset signal over path 22 can be configured to transition from a logic 0 to a logic 1 state at the end of the reset event in order to trigger the update of the sequential storage element.

FIG. 1 merely illustrates in schematic form one way of performing an update to the sequential storage element upon a reset event, dependent on the current value of the obscuring data. For sequential storage elements that have a set pin, then control signals can be issued from the update circuitry to both the set and the reset pins to control the above described functionality. However, it will be appreciated that some sequential storage elements will not have a separate set pin, and may only have a reset pin. In that arrangement, the set functionality can still be achieved by controlling the data value provided to the "D" input pin of the sequential storage element during the reset event, with that data value presented to the D input being dependent upon a current value of the obscuring data, and essentially bringing about the setting or the resetting of the sequential storage element upon the reset event (for example by loading a first value (e.g. a 1) or a second value (e.g. a 0) into the sequential storage element) dependent upon the current value of the obscuring data.

Once the data value in the storage element has been updated in the above described manner in response to the reset event, the data value is then held in the sequential element 15 during normal operation, with the output over path 19 indicating the data value stored in the sequential element. One particular way in which the update circuitry can be arranged to ensure that the sequential storage element is updated once as the circuitry comes out of reset will be described later with reference to FIGS. 3 and 4.

Figure 2:
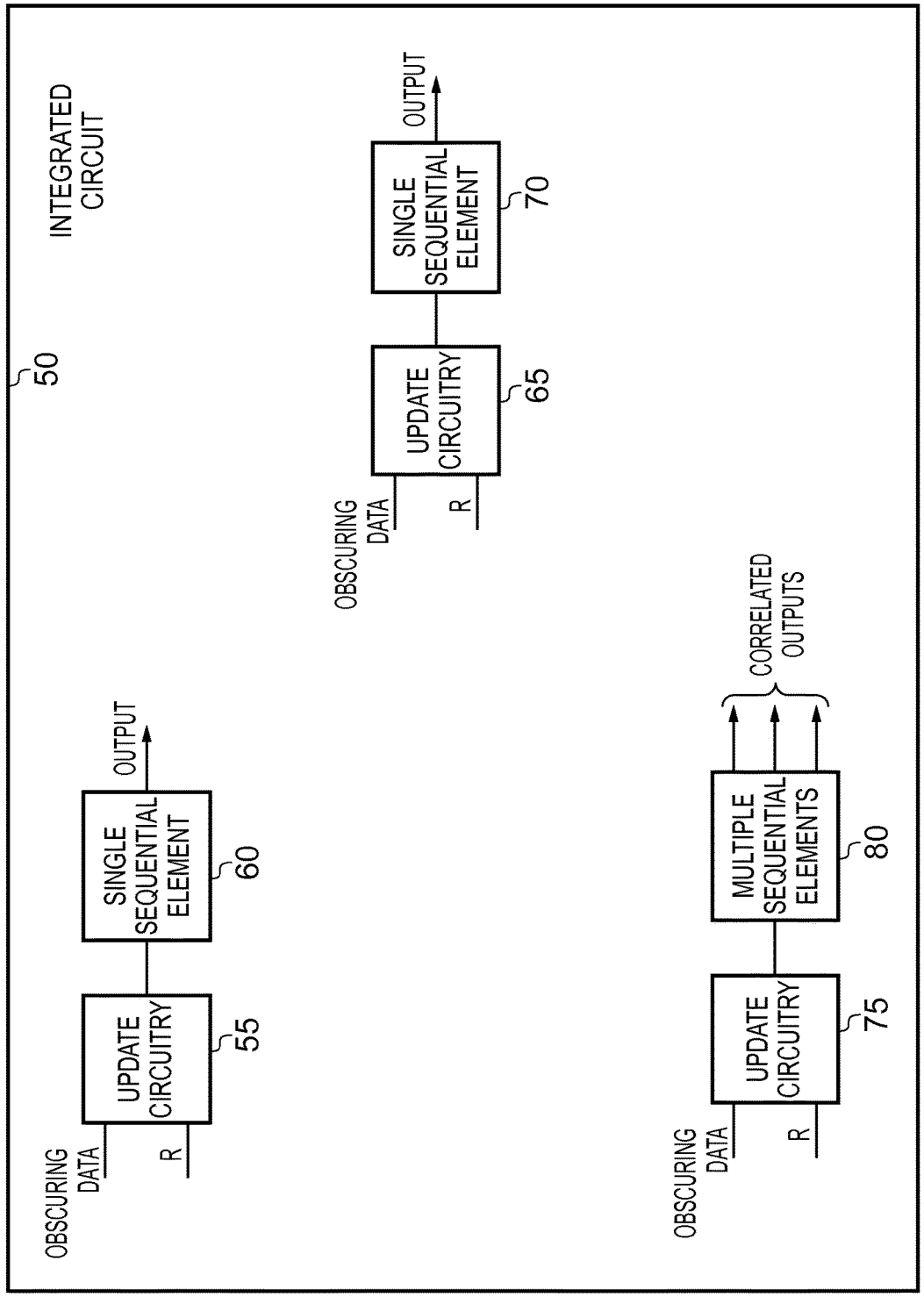
FIG. 2 is a diagram schematically illustrating an integrated circuit incorporating various instances of the apparatus of FIG. 1, in accordance with one embodiment.

Typically, an integrated circuit will be arranged to include multiple of the above described sequential storage elements, and these sequential storage elements may be distributed through the integrated circuit, as shown for example in FIG. 2. In particular, a single sequential storage element 60 is shown along with associated update circuitry 55, and elsewhere in the integrated circuit 50 another single sequential storage element 70 is shown along with its associated update circuitry 65. The obscuring data generated for each of these two instances of sequential storage elements 60, 70 may be specified independently, such that at any particular point in time the obscuring data input to the update circuitry 55 will not necessarily be the same as the obscuring data input to the update circuitry 65. In particular, separate obscuring data generators (e.g. separate pseudo-random number generators) may for example be provided in association with each of the update circuits 55, 65. Alternatively, both of the update circuits 55, 65 may receive the same obscuring data generated by a single obscuring data generator.

Alternatively, or in addition, there may be multiple sequential storage elements that are arranged to form a group of storage elements, and which are arranged to store different but correlated data values in dependence on the current value of the obscuring data. This is for example shown in FIG. 2 by the multiple sequential elements 80, which are associated with update circuitry 75 that receives a single obscuring data value. The update circuitry 75 is then arranged to produce a set of data values for storing in the multiple sequential elements 80, but which data value from that set is stored in which of the sequential storage elements is dependent on the obscuring data. Hence on each reset event, the way in which that set of data values is stored in the multiple sequential elements will vary dependent on the current value of the obscuring data. As will be discussed in more detail later, this can provide some enhanced protection against security attacks, by remapping various control signals differently between each reset event dependent on the contents of the multiple sequential elements 80.

Figure 3:
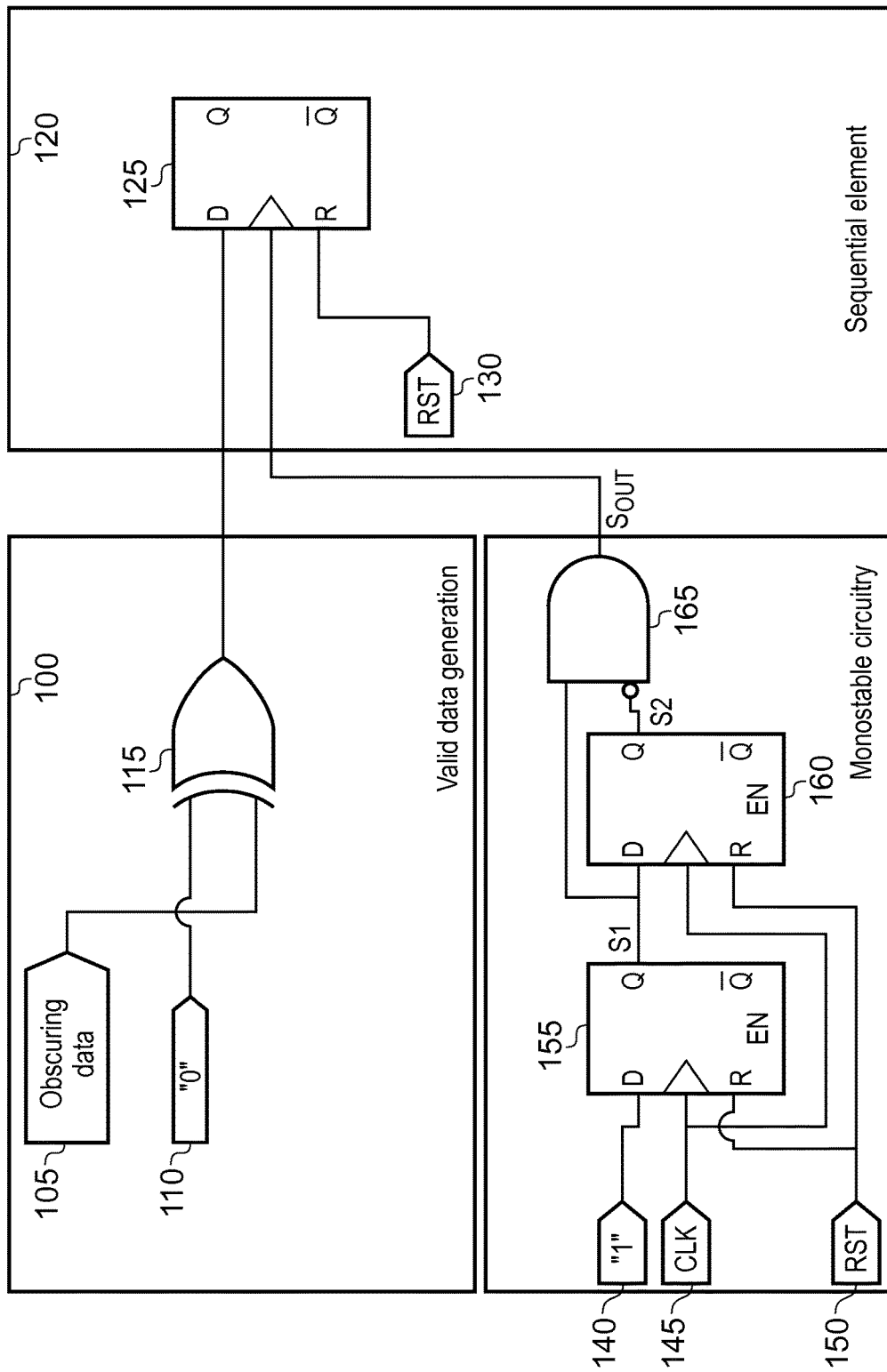
FIG. 3 is a diagram illustrating in more detail the update circuitry provided in association with a storage element in accordance with one embodiment.

FIG. 3 is a diagram illustrating in more detail the update circuitry in accordance with one embodiment, in this embodiment, the update circuitry consisting of the valid data generation block 100 and the monostable circuitry 135. The update circuitry is used to control the data stored in the sequential element block 120, which in this embodiment consists of a single sequential storage element 125. The reset signal is received at a reset pin 130 and provided directly to the reset input of the sequential storage element 125. The valid data generation block 100 then provides data to the D input of the sequential storage element 125, whilst the monostable circuitry 135 generates a clock signal input to the sequential storage element.

In this embodiment, the valid data generation circuit consists of an XOR gate 115 receiving a logic 0 value from the input 110 at one of its inputs, and receiving the obscuring data from the input 105 at its other input. It will accordingly be appreciated that when the obscuring data has a logic 0 value, a logic 0 value will be output from the XOR gate 115 to the D input of the sequential storage element 125, whereas when the obscuring data has a logic 1 value, a logic 1 value will be output from the XOR gate 115 to the D input of the sequential storage element 125. Indeed, in this simple example the XOR gate 115 is not required, and the obscuring data can merely be provided directly to the D input. However, it is shown for consistency with the later discussed FIG. 4, where the update circuitry is used to control the data stored in a group of storage elements in dependence on the obscuring data, where that group of storage elements store different but correlated data values, and the XOR functionality ensures that a different data value is stored within each of the storage elements.

The monostable circuitry 135 of FIG. 3 is used to generate a single rising edge when the integrated circuit containing the circuitry comes out of reset. This causes the data output by the valid data generation block 100 to then be stored into the associated sequential storage element 125. The monostable circuitry 135 then generates no further rising clock edge during normal operation of the circuitry, and accordingly the value stored in the sequential storage element as the circuitry comes out of reset is maintained for the duration of the normal operation of the circuitry following the reset.

Figure 5:
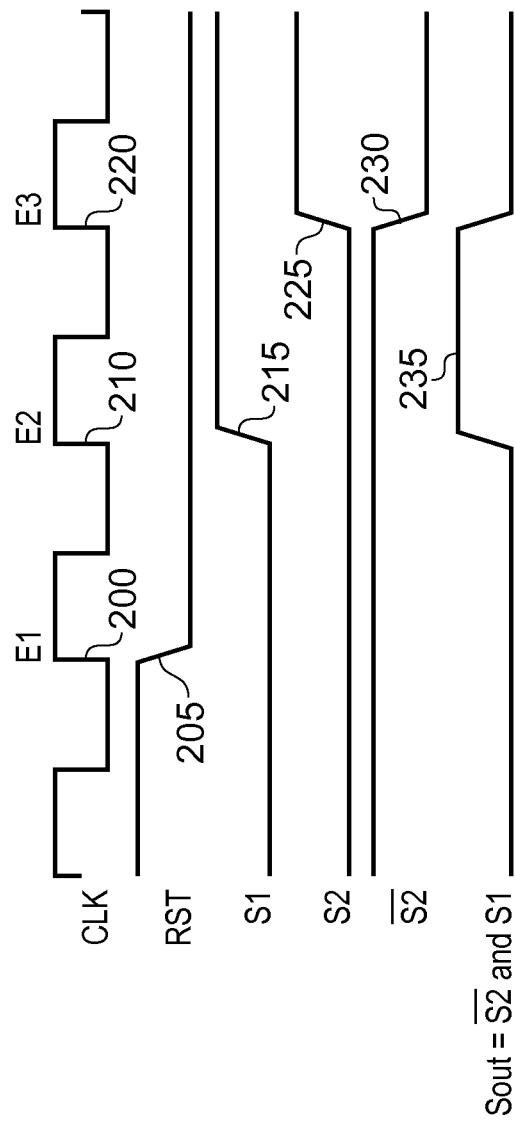
FIG. 5 is a timing diagram illustrating the operation of the monostable circuitry of FIGS. 3 and 4, in accordance with one embodiment.

The operation of the monostable circuitry 135 will be illustrated further with reference to the timing diagram of FIG. 5. In particular, the clock pulse shown at the top of FIG. 5 is received at the clock input 145 and provided to both of the flip-flops 155, 160. When the reset operation ends, the reset signal at pin 150 transitions to a logic 0 value, as shown by the transition 205 in FIG. 5 occurring on the rising clock edge 200. This causes the logic 1 value at the input 140 to be sampled by the flip-flop 155 and accordingly that logic 1 value is propagated to the output over path S1 on the rising edge 210 of the clock signal, as shown by the transition 215 in FIG. 5. That logic 1 value will then be sampled by the second flip-flop 160, and one cycle later will appear on the output path S2 at the rising edge 220 of the clock signal, as indicated by the transition 225 in FIG. 5. The AND gate 165 receives the output S1 and the inverted version of the output S2. Accordingly, it will be appreciated that the inverted version of S2 transitions to a logic 0 value at point 230 as shown in FIG. 5, and there is exactly one clock cycle where both S1 and the inverted version of S2 are at a logic 1 level. Accordingly, the output from the AND gate 165 will be at a logic 0 value, except for the one cycle where it is a logic 1 value, as indicated by the transition 235 in FIG. 5. The sequential storage element 125 will sample the data provided from the valid data generation block 100 on the rising edge of the clock period indicated by the transition 235 assuming the element 125 is a flip-flop (or during the clock period indicated by the transition 235 if the element 125 is instead a latch), whereafter that sampled value will then be output from the sequential storage element. As is typical for sequential storage elements, the sequential storage element 125 will both generate the output value Q and an inverted version of that output value.

It will be understood that the sequential storage element 125 shown in FIG. 2 can be an edge sensitive device such as a flip flop, where the data will be sampled on the rising edge of the output signal $S_{out}$ shown in FIG. 5. However, alternatively it could be a state sensitive device such as a latch, where the data will be sampled as long as the output signal $S_{out}$ is at a logic one value, and then will be held when the output signal $S_{out}$ is at a logic zero value.

Figure 4:
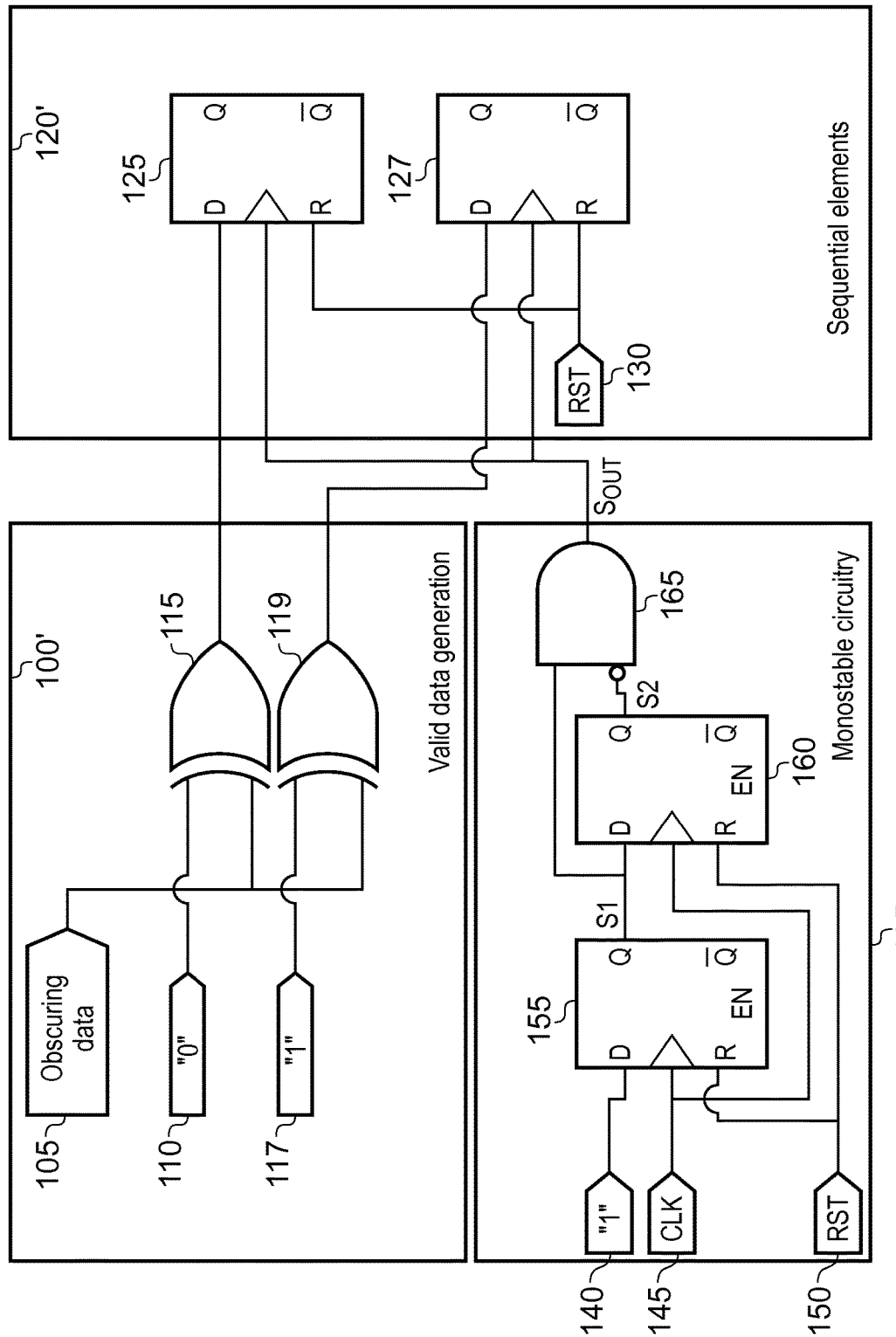
FIG. 4 is a diagram illustrating in more detail the update circuitry provided in association with multiple storage elements forming a group of storage elements that store different but correlated data values, in accordance with one embodiment.

FIG. 4 is a diagram similar to FIG. 3, that shows a situation where the update circuitry is associated with multiple sequential storage elements within the sequential storage element block 120'. The monostable circuitry 135 in FIG. 4 is identical to that shown in FIG. 3. However the valid data generation block 100' is modified with respect to the valid data generation block 100 shown in FIG. 3 to enable it to generate multiple data values, one for each of the sequential storage elements 125, 127 within the sequential elements block 120'. As shown in FIG. 4, for each output from the valid data generation block 100', an XOR gate 115, 119 is provided, each XOR gate receiving the obscuring data from the input 105, but also receiving a predetermined input value 110, 117. The input value will be different for each of the XOR gates 115, 119. As a result, it will be understood that the output values generated from the valid data generation block 100 will be different for each of the sequential storage elements 125, 127. In particular, in this example when the obscuring data is at a logic zero value, the XOR gate 115 will output a logic zero value and the XOR gate 119 will output a logic 1 value. Conversely, when the obscuring data 105 is at a logic 1 value, the XOR gate 115 will output a logic 1 value and the XOR gate 119 will output a logic zero value.

This approach can be extended for any number of sequential storage elements within the sequential element block 120', with each of the associated XOR gates within the valid data generation block 100' receiving a different input to any other of the XOR gates, and with all of the XOR gates then receiving the obscuring data as the other input. These set of predetermined inputs 110, 117 can then be used to define all possible data values, and with the XOR gate functionality being used to determine which of those values is stored in which of the sequential storage elements of the sequential element block 120' dependent on the current value of the obscuring data at the input 105.

The set of sequential storage elements within the block 120' can then be used following the reset to modify the value of a control signal used by some downstream processing circuitry within the integrated circuit, thereby making it unpredictable how certain resources within the processing circuitry are used following each reset event. This provides further resilience against attacks such as the earlier described fault injection attack and DPA attack, since it prevents the reproducibility of certain actions following each reset event. For example, if a fault injected following a first reset event is then again injected following a second reset event, then even if the same physical resource within the apparatus is targeted by that injected fault, the physical resources will be used differently between each reset event, making it less likely that the injected fault will bring about the same effect. Further, from a DPA attack point of view, since different physical resources will be used upon each reset dependent upon the obscuring data, this reduces the ability to obtain any useful correlation information over multiple runs of the system.

Figure 6:
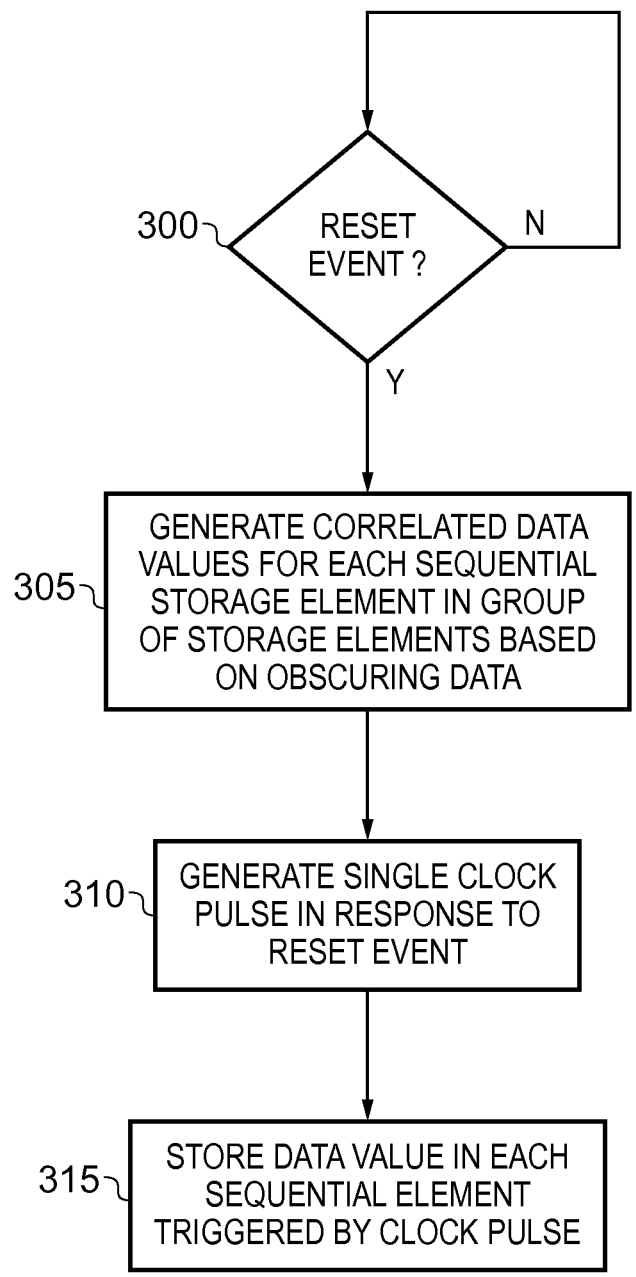
FIG. 6 is a flow diagram illustrating the operation of the circuitry of FIG. 4 in accordance with one embodiment.

FIG. 6 is a flow diagram illustrating the operation of the circuitry of FIG. 4 in one embodiment. At step 300, occurrence of a reset event is awaited, and then upon receipt of the reset event correlated data values are generated for each of the sequential storage elements in the group of storage elements, based on the obscuring data (see step 305). This operation is performed by the valid data generation block 100'. At step 310, a single clock pulse is generated in response to the reset event. As discussed earlier, in one embodiment this single clock pulse is actually generated at the end of reset, when the reset signal is de-asserted. Thereafter, at step 315, the single clock pulse causes the data values generated by the valid data generation block 100' to be stored in each of the sequential storage elements 125, 127 in the sequential elements block 120'. In one embodiment, the stored data values then control downstream operation of at least one component within the integrated circuit.

Figure 7:
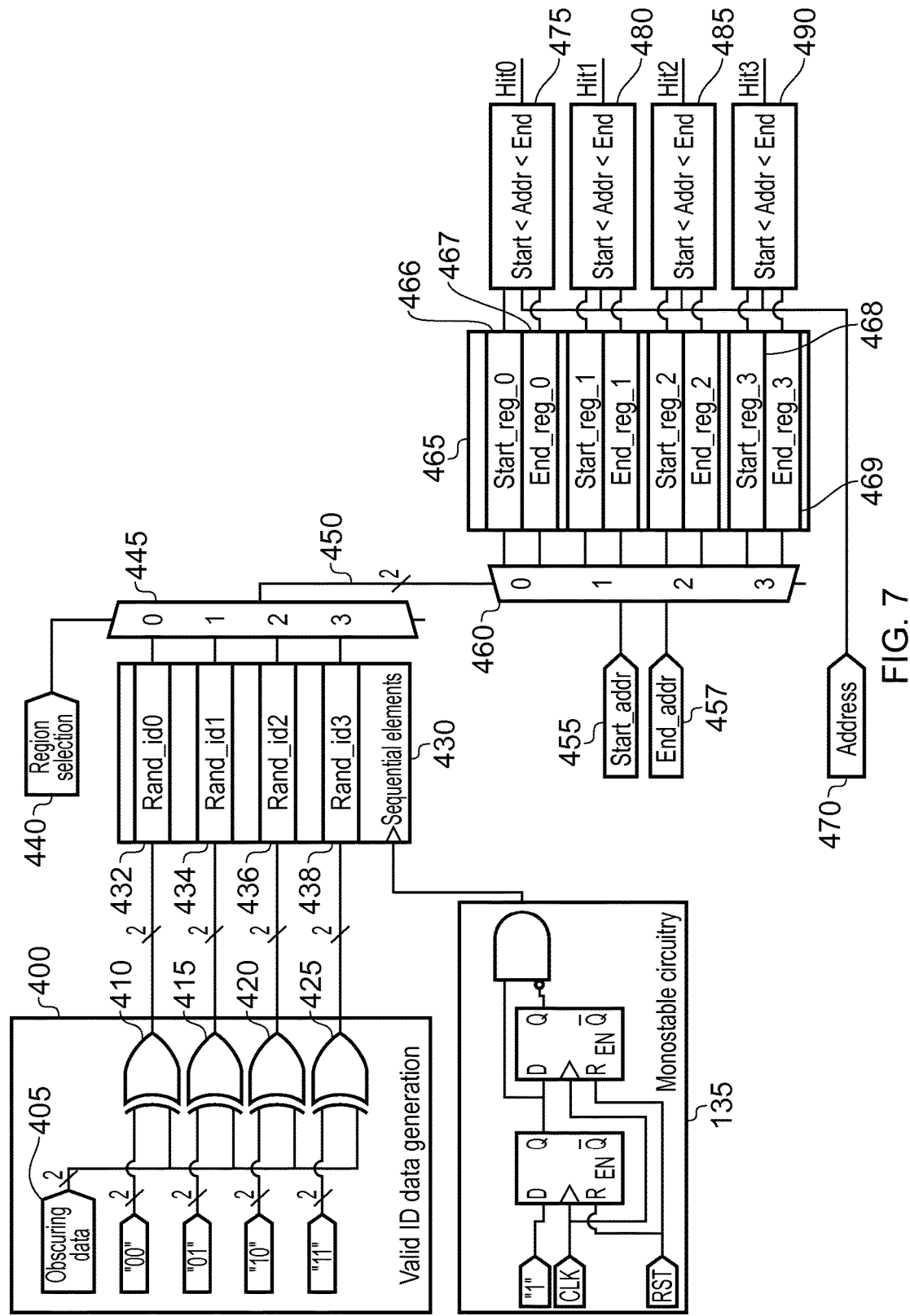
FIG. 7 is a diagram illustrating how the technique of the described embodiments may be used in association with a memory protection unit in accordance with one embodiment.

FIG. 7 illustrates one application of the above described approach within a memory protection unit (MPU). In particular, the MPU includes a set of address range registers 465, these address range registers including registers used to store a start address and end address for address ranges for each of a plurality of memory regions. In this particular example, there are four memory regions 0 to 3, each having a particular address range.

At set up time, the de-multiplexer circuitry 460 is used to store the relevant start address and end address for each memory region within allocated ones of the start and end address registers within the address range registers 465. Without the use of the above described technique, a region selection signal at input 440 would typically have been provided directly as an input to the de-multiplexer circuitry 460 in order to cause an associated start address 455 and end address 457 to be stored within a pair of the registers within the register block 465. However, this would mean that for a particular memory region, the start and end addresses are always stored within the same physical pair of registers. For example, considering the mapping shown in FIG. 7, for the memory region 0, the start and end addresses would always be stored within the physical registers 466, 467.

Following the above described setup phase, then during normal use any particular address provided as an input 470 can be input to the comparison blocks 475, 480, 485, 490, in order to determine which memory region that address relates to based on the current contents of the address range registers 465.

However, in accordance with the above described techniques, a set of sequential storage elements 430 is provided, along with associated update circuitry 400, 135, and the mechanism of the earlier described embodiments is used to vary how the physical registers within the address range register block 465 are used following each reset event. In this example, the sequential storage element block 430 includes four storage elements 432, 434, 436, 438, each being arranged to store a two bit data value output from the valid ID data generation block 400. Associated with each storage element 432, 434, 436, 438, the valid ID data generation block 400 provides an associated XOR gate 410, 415, 420, 425. Each XOR gate receives one of the valid region ID values and the obscuring data 405, the obscuring data in this instance being a two bit value. Accordingly, it will be appreciated that each of the XOR gates 410, 415, 420, 425 will produce a different two bit output value representing one of the memory region identifiers, but which memory region identifier is produced by each XOR gate will depend on the obscuring data. Accordingly, following a reset event, each of the sequential storage elements 432, 434, 436, 438 will store one of the valid memory region identifier values, but exactly how those values are mapped within the sequential storage element block 430 will depend on the obscuring data.

Then, when the start and end addresses for each memory region are to be stored within the address range register 465, the region selection signal 440 is not provided directly to the de-multiplexer 460, but instead is provided to the multiplexer block 445 forming modification circuitry. In particular, the region selection signal will be used to identify one of the storage elements 432, 434, 436, 438, and the region identifier signal stored therein will be used as a modified region selection signal output over path 450 to the de-multiplexer 460. Hence, by way of example, if the region selection signal 440 is "00" this will cause the register 432 to be selected. However, the value stored in the storage element 432 will be dependent on the obscuring data. As a result, the actual pair of physical registers used to store the start address and end address for the memory region 0 will vary dependent on the contents of the storage element 432. Hence, purely by way of example, whilst following one reset event, the physical registers 466, 467 may be used to store the start and end address for memory region 0, following another reset event the physical registers 468 and 469 may be used to store the start and end addresses for memory region 0 (in the example where storage element 432 stores the value "11" following that reset event). While such an approach does not inhibit the correct operation of software running on the apparatus, since from a software perspective, it does not matter which physical registers the start and end addresses are stored in, such an approach will prevent an attacker obtaining a coherent probing result from the MPU between each reset event, and hence will prevent reliable reproduction of steps performed by an attacker.

Figure 8:
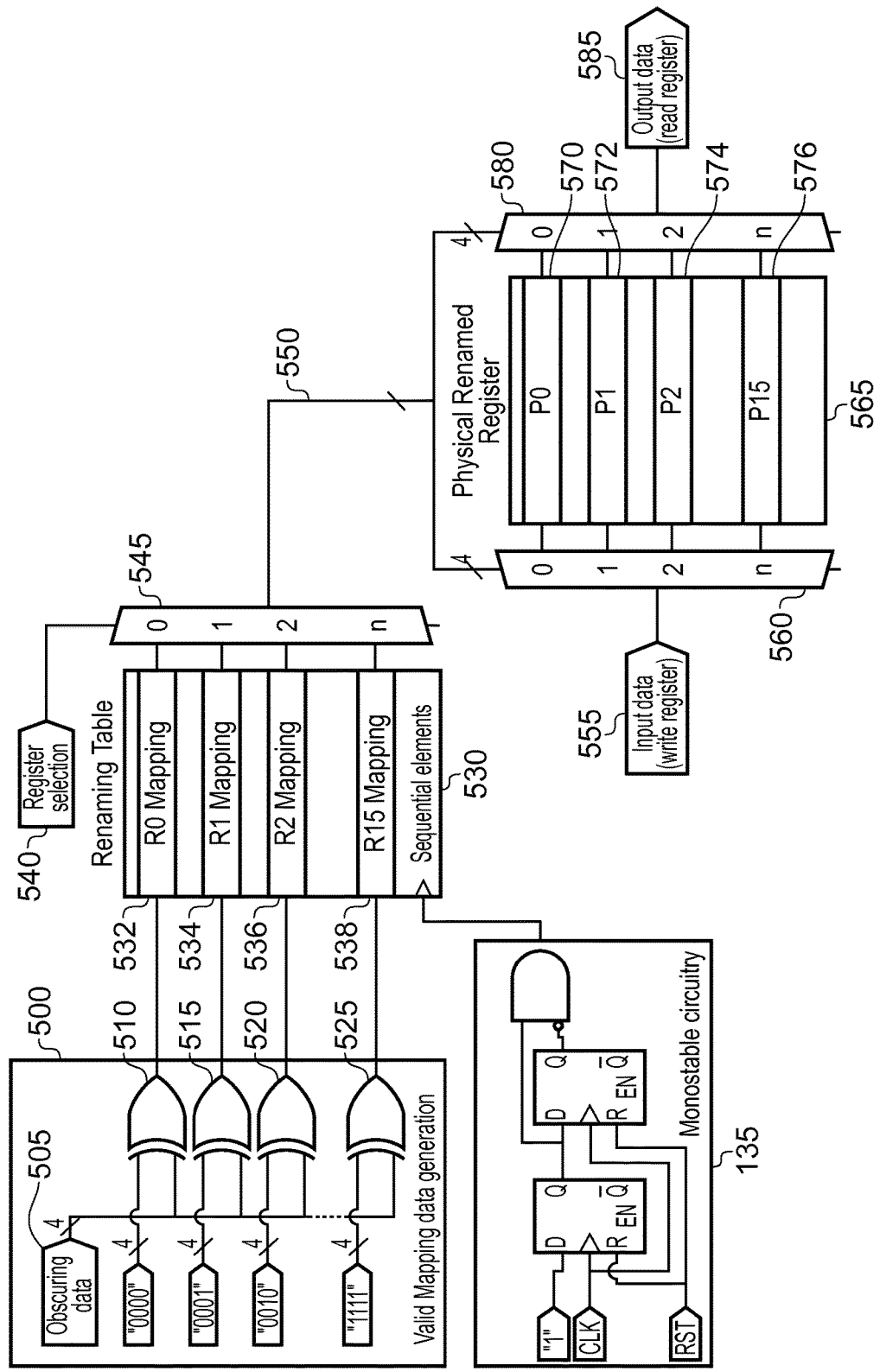
FIG. 8 is a diagram illustrating how the technique of the described embodiments may be used in association with a register renaming implementation in accordance with one embodiment.

FIG. 8 illustrates another example use of the above described technique. In this embodiment, a set of sequential storage elements within the block 530 are used to implement a renaming table used to map logical registers specified by instructions to physical registers within the physical register block 565. In particular, the sequential elements block 530 contains a sequence of sixteen storage elements 532, 534, 536, 538, each storage element being associated with one of the logical registers, and being arranged to store a data value indicating the physical register to be mapped to that logical register. When a logical register is specified at the input 540, it is provided to the multiplexer 545, in order to identify one of the storage elements 532, 534, 536, 538, and the data value stored therein is then provided over the path 550 to identify the physical register currently mapped to that logical register. This enables input data provided at the input 555 to be written into the appropriate physical register 570, 572, 574, 576 of the physical register block 565 via the multiplexer 560, or for data to be read from the appropriate physical register via the de-multiplexer circuitry 580 resulting in output read data over path 585.

By associating the update circuitry in the form of the valid mapping data generation block 500 and monostable circuitry 135 with the sequential storage element block 530, the logical to physical register address mapping can be varied between each reset event, dependent on the current obscuring data 505. As with the earlier example, a separate XOR gate 510, 515, 520, 525 is provided in association with the storage elements 532, 534, 536, 538 within the sequential elements block 530. Each of the XOR gates receives a different valid data input and the obscuring data 505, with the obscuring data then controlling how those various valid inputs are mapped to the sequential storage elements 532, 534, 536, 538. As a result, the logical to physical register address mapping varies between each reset event. This prevents an attacker from seeking to use fault injection to re-create the same faults between each reset event, because the physical register usage will vary between reset events. Further, regarding a DPA attack, since the way in which the physical registers are reused varies between each reset event, this inhibits the obtaining of useful correlation data from the DPA technique.

From the above described embodiments, it will be appreciated that such embodiments provide a way for effectively randomising initialisation of certain register elements in an integrated circuit to protect the circuit against attacks performed at reset. In accordance with the described technique, such register elements are reset in an unpredictable way following each reset event, depending on a current value of obscuring data, which in one embodiment can take the form of a pseudo-random data value or key provided from elsewhere in the system (for example, a pseudo-random number generator). Such randomisation of the data stored within the sequential elements at initialisation significantly improves robustness against attacks, since often such attack techniques rely on sequential elements being reset to a predictable value following a reset event. Further, in one embodiment, a set of storage elements initialised in such a way can be used to change how physical resources of the integrated circuit are used following each reset event, further inhibiting attacks, such as those based on fault injection or DPA.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. An apparatus for enhancing resilience to attacks, comprising:
   a plurality of storage elements forming a remapping group of storage elements
   update circuitry configured to receive obscuring data, and responsive to a reset event to store in each of said at least one storage element a data value that is dependent on a current value of the obscuring data;
   modification circuitry configured to modify a value of a control signal dependent on the remapping group of storage elements in order to generate a modified value for the control signal; and
   processing circuitry configured to operate in dependence on the modified value of the control signal,
   wherein the modification circuitry is configured to use the value of the control signal to identify a storage element within said remapping group, and to output the data value stored in the identified storage element as the modified value of the control signal.

2. An apparatus as claimed in claim 1, further comprising:
obscuring data generation circuitry responsive to a trigger event to generate the current value for the obscuring data.

3. An apparatus as claimed in claim 2, wherein the trigger event is configured to occur at least once for each occurrence of the reset event.

4. An apparatus as claimed in claim 3, wherein said trigger event comprises said reset event.

5. An apparatus as claimed in claim 1, wherein the current value of the obscuring data is specified independently for each storage element.

6. An apparatus as claimed in claim 1, wherein the current value of the obscuring data is shared between the plurality of storage elements, and the update circuitry is responsive to the reset event to store different but correlated data values in each of the plurality of storage elements in dependence on the current value of the obscuring data.

7. An apparatus as claimed in claim 1, wherein the current value of the obscuring data is pseudo random value.

8. An apparatus as claimed in claim 1, wherein, for each of said plurality of storage elements, the update circuitry is responsive to the reset event to perform one of setting that storage element and resetting that storage element, dependent on the current value of the obscuring data.

9. An apparatus as claimed in claim 1, wherein the update circuitry implements an XOR function using the current value of the obscuring data as one input and a predetermined value as another input.

10. An apparatus as claimed in claim 1, wherein each of said plurality of storage elements comprises one of a flip-flop and a latch.

11. An apparatus as claimed in claim 1, wherein:
memory address space for the apparatus is formed of a plurality of memory regions;
the processing circuitry is a memory protection unit having address range registers used to identify an address range for each memory region;
said remapping group of storage elements identify which address range registers are associated with each memory region; and
the control signal comprises a memory region identifier signal.

12. An apparatus as claimed in claim 11, wherein the modification circuitry is configured to use the value of the memory region identifier signal to identify a storage element within said remapping group, and to output the data value stored in the identified storage element as the modified value of the memory region identifier signal.

13. An apparatus as claimed in claim 1 wherein:
the remapping group of storage elements form a renaming table providing a logical address to physical address mapping for registers;
the value of the control signal specifies a logical address for a register; and
the modification circuitry is configured to convert the logical address into a corresponding physical address for the register in dependence on the renaming table, in order to output as the modified value for the control signal the corresponding physical address.

14. An apparatus as claimed in claim 13, wherein the processing circuitry is configured to perform a register access operation in respect of the register identified by the physical address forming the modified value for the control signal.

15. A method of updating within an apparatus a plurality of storage elements forming a remapping group of storage elements in order to enhance resilience to attacks, comprising:
receiving obscuring data;
responsive to a reset event, storing in each of said plurality of storage element a data value that is dependent on a current value of the obscuring data;
modifying a value of a control signal dependent on the remapping group of storage elements in order to generate a modified value for the control signal; and
operating processing circuitry in dependence on the modified value of the control signal;
wherein the modifying step uses the value of the control signal to identify a storage element within said remapping group, and to output the data value stored in the identified storage element as the modified value of the control signal.

16. An apparatus for enhancing resilience to attacks, comprising:
a plurality of storage element means forming a remapping group of storage element mean;
update means for receiving obscuring data, and responsive to a reset event, for storing in each of said plurality of storage element means a data value that is dependent on a current value of the obscuring data;
modification means for modifying a value of a control signal dependent on the remapping group of storage element means in order to generate a modified value for the control signal; and
processing means for operating in dependence on the modified value of the control signal;
wherein the modification means uses the value of the control signal to identify a storage element means within said remapping group, and to output the data value stored in the identified storage element means as the modified value of the control signal.

* * * * *